INVENTORS
D. BLAISDELL AND
T. J. JUDGE
BY Forest B. Hitchcock
THEIR ATTORNEY

INVENTORS
D. BLAISDELL AND
T. J. JUDGE
BY Forest B. Hitchcock
THEIR ATTORNEY

July 7, 1964 D. BLAISDELL ETAL 3,140,468

SELECTIVE CALLING SYSTEM

Filed May 4, 1960 4 Sheets-Sheet 3

FIG. 2B.

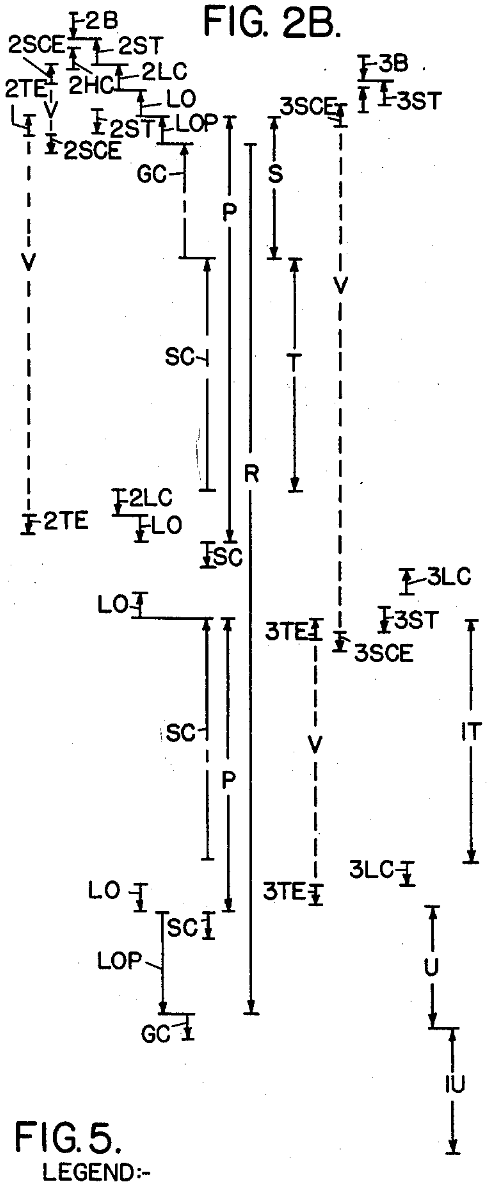

FIG. 4B.

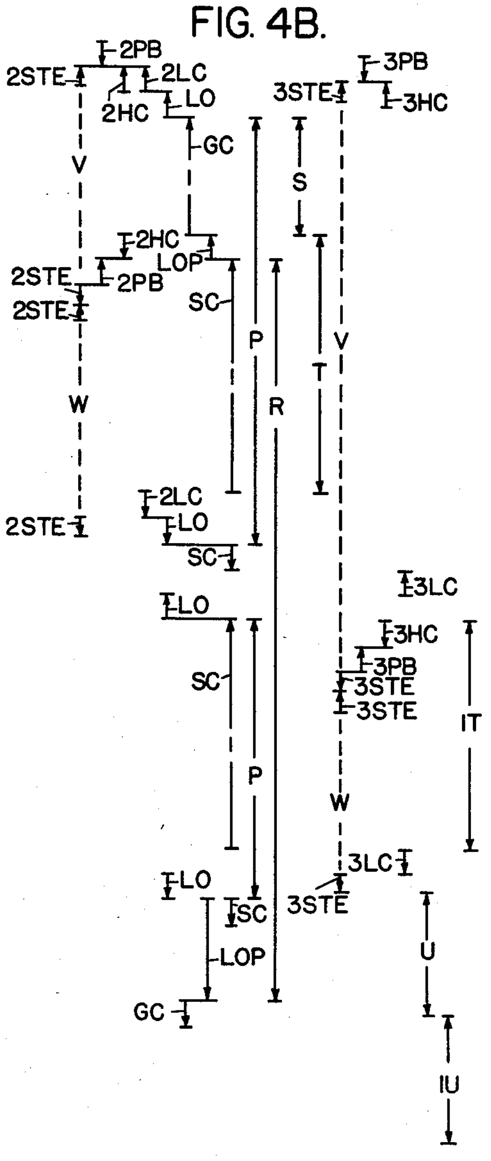

FIG. 5.

LEGEND:-

P= TIME T.M.& P.U. IS CONNECTED TO ENERGY SOURCE VIA LO CONTACT
R= TIME T.M.& P.U. IS CONNECTED TO ENERGY SOURCE VIA LOP CONTACT
S= TIME TONE GEN. f6 IS CONNECTED TO ENERGY SOURCE
T= TIME TONE GEN. f1, f3, f4 & f5 ARE CONNECTED TO ENERGY SOURCE
IT= TIME TONE GEN. f1, f2, f3 & f4 ARE CONNECTED TO ENERGY SOURCE
U= TIME OF COMMUNICATION BETWEEN STATIONS 10 & 12
IU= TIME OF COMMUNICATION BETWEEN STATIONS 10 & 13
V= STEADY ILLUMINATION
W= FLASHING ILLUMINATION

INVENTORS.
D. BLAISDELL AND
T. J. JUDGE
BY
Forest B. Hitchcock
THEIR ATTORNEY

INVENTORS
D. BLAISDELL AND
T. J. JUDGE
BY Forest B. Hitchcock
THEIR ATTORNEY

United States Patent Office 3,140,468
Patented July 7, 1964

3,140,468
SELECTIVE CALLING SYSTEM
Donald Blaisdell and Thomas J. Judge, Rochester, N.Y., assignors to General Signal Corporation, a corporation of New York
Filed May 4, 1960, Ser. No. 26,898
8 Claims. (Cl. 340—171)

This invention relates to a selective calling system, and more particularly pertains to such a system for apprising respective operators at all remotely located stations that the operator at a central station desires to communicate with one or more of the operators at such remotely located stations.

It has been found desirable to employ an additional system in connection with the usual radio communication networks employed in such areas as fire apparatus dispatching, police car dispatching, taxi cab dispatching etc. for apprising the operators at the remotely located stations, whether such stations are movable in the form of police cars or otherwise, that the operator at the central station or dispatching station is desirous of communicating with one or more of the operators at respective remotely located stations. Systems of a varied nature have been provided to effect the notification of respective operators at remotely located stations.

One type of system employs tones of particular frequencies which are caused to be transmitted from the central station for providing a tone calling signal at respective remotely located stations for the receivers having detection means responsive to the frequencies of corresponding tones. More particularly, this type of system requires that four tone generators be operated for causing a resultant tone frequency to be transmitted to all remotely located stations, but to be detectable only at the corresponding remotely located station for apprising the operator thereat that the operator located at the central station desires to communicate with him. This system requires that a push button be actuated for each such tone generator for providing the operation thereof with each of the remotely located stations being identified by a particular combination of push buttons for operating certain of the plurality of tone generators for causing a corresponding tone frequency to be transmitted. This manner of selection is time consuming and is susceptible of somewhat frequent wrong selections.

It is understandable that the operators at the remotely located stations are at times communicating with each other which communication is effective to provide that the common communication channel be almost constantly in use for a complex system. It is thus understandable that the operator at the central station is sometimes delayed because of the use of such common communication channel in his communication to respective remotely located stations. Under certain circumstances, it is obvious that such delay in communication could have somewhat disastrous results.

The present invention proposes to provide a system which permits the operator at the central station to cause a tone frequency detectable by all remotely located stations to be initially transmitted for apprising the operators thereat that they should interrupt their communication between remotely located stations since the operator at the central station desires to communicate with certain of the operators at respective remotely located stations. In addition, the present invention proposes that a tone calling signal be transmitted to each of the remotely located stations that the operator located at the central station desires to communicate with, with the transmission of the calling signals being transmitted to the remotely located stations in the sequence in which the operator at the central station desires to communicate with the operators at respective remotely located stations. Thus, the operators at remotely located stations are apprised of the intention of the operator at the central station to communicate therewith.

Generally speaking, and without attempting to define the exact scope of the present invention, a push button means is included for each of the remotely located stations with the selective calling system employed with the transmitter at the central station. The actuation of one or more of such push buttons initially causes a tone frequency to be transmitted to all remotely located stations and is detectable thereat, while thereafter tone frequencies are transmitted to all remotely located stations but are detectable at only the respective remotely located stations corresponding thereto. To provide the different tones, a plurality of tone generators are caused to be operated concurrently in particular combinations with less than the total number thereof being operated for each combination in accordance with a particular relay being energized for each push button actuated. Thus, the present invention provides that a tone frequency be transmitted and detectable at all remotely located stations with respective resultant tone frequencies being transmitted in sequence but detectable at only the corresponding remotely located stations.

Thus, one object of this invention is to provide a selective calling system which is adaptable to the usual radio communication network employed for communicating between a central station and a plurality of remotely located stations by means of which a tone is employed to gain the attention of all operators at respective remotely located stations, while the attention of operators located at selected stations is thereafter gained in sequence with corresponding tone frequencies.

Another object of this invention is to provide a selective calling system in which the manual designation of one button for each remotely located station is required to cause a predetermined group of tone generators to be energized for effecting the subsequent transmission of a resultant tone frequency to the corresponding remote station.

Another object of this invention is to provide a selective calling system in which a tone frequency is transmitted to all remote stations for a predetermined duration of time, while thereafter other tone frequencies are transmitted separately to several selected remotely located stations in sequence for a longer predetermined duration of time.

Another object of this invention is to provide a selective calling system in which two separate indicating means are provided for each button where one indicating means is employed to denote that the respective remote station will have a tone frequency transmitted thereto, while the other indicating means is employed to denote the time at which such transmission is in effect.

Another object of this invention is to provide a selective calling system in which one indicating means is provided for each button where one indication thereof is employed to denote that the respective station will have a tone frequency transmitted thereto, while another indication thereof is employed to denote the time at which such transmission is in effect.

Another object of this invention is to provide a selective calling system in which the transmitting means responsive to the operation of the plurality of tone generators has the energy source therefor normally disconnected therefrom, but which is connected for operating the transmitting means during the transmission of tone frequencies to respective remotely located stations.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which:

FIG. 2B is a sequence chart for a typical operation of the embodiment shown in FIG. 2A;

FIG. 4B is a sequence chart for a typical operation of the embodiment shown in FIG. 4A; and FIG. 5 shows the legends and respective meanings thereof employed in FIGS. 2B and 4B.

For the purpose of simplifying the illustration and facilitating in the explanation, the various parts and circuits constituting the embodiments of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and the contacts are illustrated in a conventional manner, and the symbols (+) and (−) are used to indicate connections to the terminals of batteries, or other sources of electric current, instead of showing all of the wiring connections to these terminals.

GENERAL ORGANIZATION

It has been stated above that the present invention is employable with the usual radio communication network used in dispatching systems for areas such as police cars, fire apparatus, taxi cabs etc. In such areas, the type of communication network is usually radio with only a single channel thereof being employed. Although this type of radio communication network is illustrated in FIG. 1 with the present invention, it should be understood that a wire transmission system as well as other types of communication systems could equally be employed with the present invention.

Figure 1:
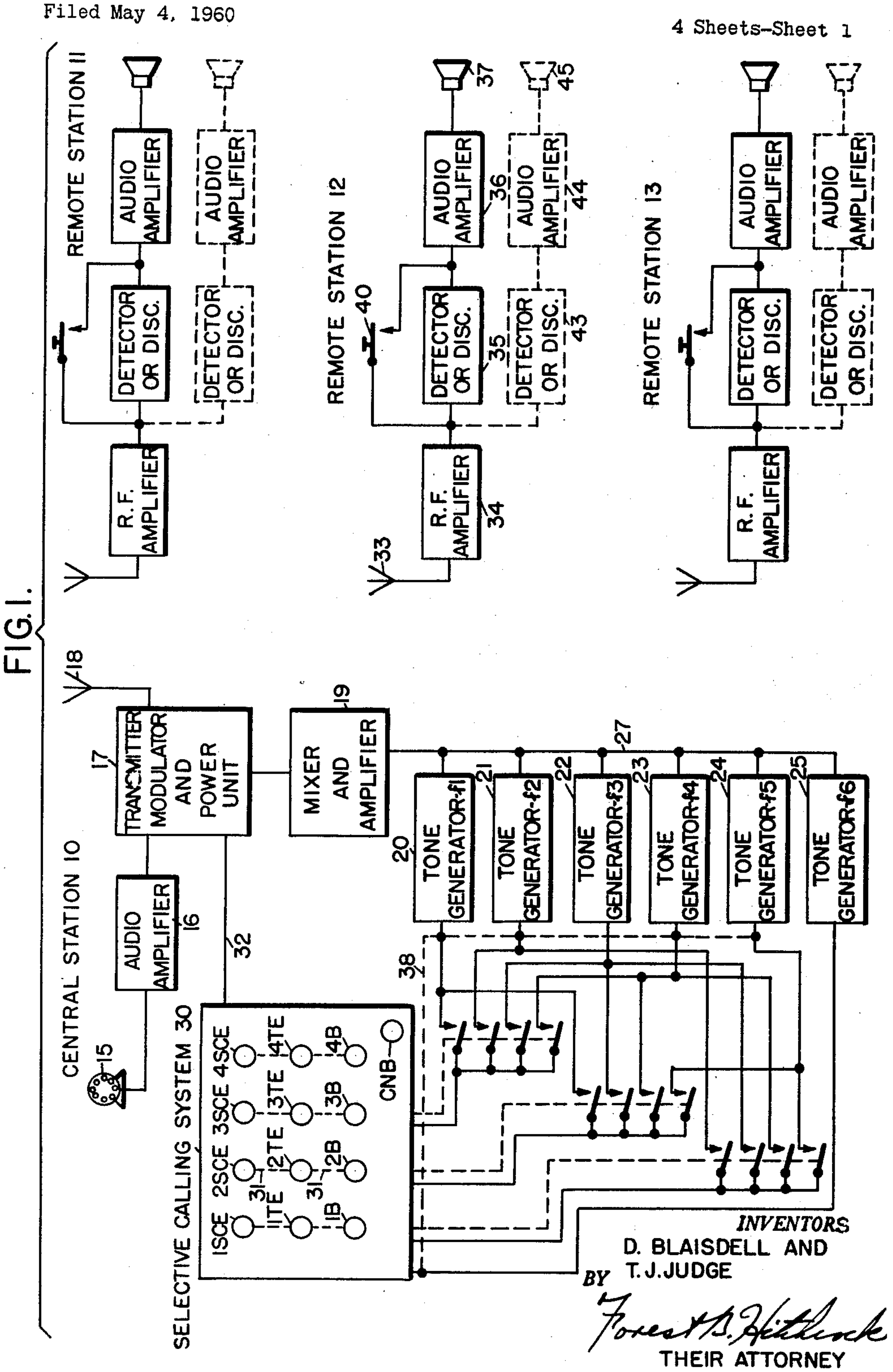
FIG. 1 is a block diagram illustrating a radio communication network utilizing the selective calling system in accordance with this invention.

Referring to FIG. 1, a radio communication network is illustrated by block diagram with the selective calling system being illustrated by block diagram therewith. More particularly, a central station 10 and three remote stations 11, 12 and 13 are illustrated as shown.

The central station 10 includes a microphone 15, an audio amplifier 16, a transmitter modulator and power unit 17 and a transmitting antenna 18. To the transmitter modulator and power unit 17 is connected a mixer and amplifier 19. A plurality of tone generators including generators 20, 21, 22, 23, 24 and 25 having the frequencies *f1*, *f2*, *f3*, *f4*, *f5* and *f6* respectively are connected over a common bus 27 to the mixer and amplifier 19. All of such tone generators are held normally inoperative in accordance with the selective calling system 30. It is noted that the selective calling system 30 includes four buttons 1B, 2B, 3B and 4B with each of such buttons having two lamps associated therewith. The button 2B, for example, has a transmitting lamp 2TE and a station call lamp 2SCE associated therewith as indicated by the dotted lines 31. An additional button CNB employed to cancel storages resulting from the actuation of buttons 1B through 4B is shown with selective calling system 30. The tone generators 20 through 24 are shown to be connected in combinations through contacts associated with buttons 1B, 2B and 3B, while the tone generator 25 is shown to be connected directly to the selective calling system 30. A control circuit is additionally established over wire 32 between system 30 and transmitter 17 as will be explained below.

The microphone 15, amplifier 16 and transmitter 17 are employed in the usual manner to receive a voice message and to then cause such message to be communicated via the transmitter antenna 18. The selective calling system 30 provides that the tone generator 25 be energized for causing a tone frequency to be transmitted with the tone generators 20 through 24 being additionally energized thereafter for causing resultant tone frequencies therefor to be transmitted with the tone frequencies being combined by the mixer and amplifier 19. A combination of the tone generators 20 through 24 as indicated by dotted line 38 may be employed in lieu of tone generator 25 for providing a distinct tone frequency.

Each of the remote stations 11, 12 and 13 is seen to include a receiving antenna 33, an RF amplifier 34, a detector or discriminator 35, an audio amplifier 36 and a sound producing device 37. This is seen to be the usual radio frequency receiving circuit. A detector or discriminator will be employed, however, in accordance with the type of modulation employed, i.e., amplitude or frequency modulation respectively. In order to provide that each receiver be receptive to more than the frequency to which its detector or discriminator 35 is tuned, a push button 40 is connected in shunt with the detector or discriminator 35 which is employed when it is desired to be nonselective as to the tone frequencies of the other remote stations for monitoring purposes. In addition, another detector or discriminator 43, an audio amplifier 44 and a sound producing device 45, all shown by dotted block diagram, may be included in accordance with the two tone frequencies to which each receiver is desired to be receptive to.

Figure 2A:
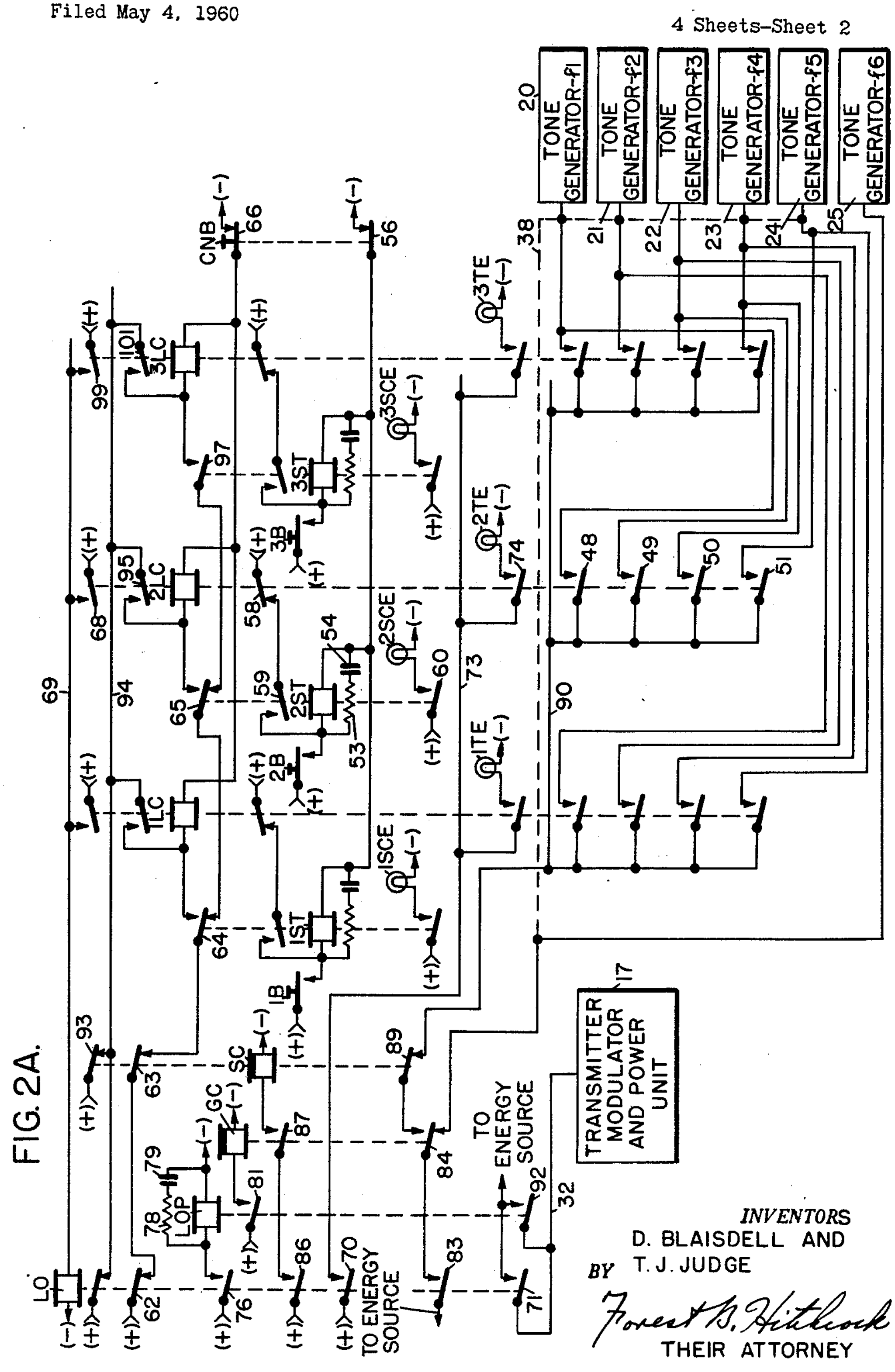
FIG. 2A is a circuit diagram illustrating one embodiment of the selective calling system in accordance with this invention.

*Structure of FIG. 2A*

Referring to FIG. 2A, the tone generators 20, 21, 22, 23 and 24 are seen to be connected to groups of normally open front contacts in particular combinations where such groups of contacts are respectively associated with relays corresponding to respective remotely located stations. Three of such relays included in the detailed circuit shown in FIG. 2A are location relays 1LC, 2LC and 3LC corresponding to the remote stations 11, 12 and 13 respectively. More particularly, tone generators 20, 22, 23 and 24 are seen to be connected to normally open front contacts 48, 49, 50 and 51 respectively of location code relay 2LC. Other apparatus associated with each of the remote stations 11, 12 and 13 includes, respectively, the buttons 1B, 2B and 3B. The associated transmitting lamp TE and station call lamp SCE are included with the apparatus for each of such remote stations. In addition, a storage relay is provided for each of the remote stations 11, 12 and 13 such as storage relay 2ST for remote station 12.

The general manner of operation is such that the button corresponding to a remote station is actuated for causing the energization of the corresponding storage relay, while thereafter the location code relay is caused to be energized. The station call lamp is adapted to be energized in accordance with the energization of the corresponding storage relay while the transmitting lamp is adapted to be energized in accordance with the corresponding location code relay and lockout relay LO common to all of the location code LC relays.

A timing circuit including lockout repeater relay LOP, general call relay GC and station call relay SC are adapted to be energized in sequence in accordance with the control or energization of lockout relay LO. The transmitting lamps are adapted to be energized in accordance with the energization of relay LO while the tone generators 20 through 24 are adapted to be operated in accordance with the energization of relay LO and the subsequent control of relays GC and SC. Tone generator 25 is adapted to be operated in accordance with the energization of relays LO and GC. During the time which tone frequencies are being transmitted to respective remote stations, the transmitter modulator and power unit 17 is adapted to be connected to an energy source over wire 32 in accordance with the energization of either relay LO or relay LOP.

The buttons 1B, 2B and 3B are each adapted to be actuated, but released in a short time in accordance with energy supplied to corresponding storage relays. To insure that each such storage relay is energized appropriately, a resistor capacitor arrangement is connected in shunt therewith to effect such complete energization thereof. For example, resistor 53 and capacitor 54 is connected in series and in shunt with storage relay 2ST corresponding to remote station 12. In order to provide that the respective location code relays and the storage ST relays remain energized at the appropriate times, stick circuits therefor are completed through a cancel button CNB. The function of such button CNB is to complete such stick circuits, but to additionally permit such stick circuits to be disconnected at appropriate times for returning the system to an at rest condition.

*Operation of FIG. 2A*

To more clearly understand the embodiment of the present invention shown in FIG. 2A, a typical operation thereof will now be considered. With such typical operation, let it be assumed that it is desired to cause a tone frequency detectable by all remote stations, or in this case remote stations 11, 12 and 13, to be transmitted. In addition, let it be assumed that it is desired to cause respective tone frequencies to be transmitted to and detected at remote stations 12 and 13.

In accordance with the above assumption, the buttons 2B and 3B would be actuated in sequence. In response to such actuation, the apparatus shown in FIG. 2A would thus be respectively operated for causing such tone frequencies to be transmitted. The sequence in which such apparatus is operated would be as shown in the sequence chart of FIG. 2B. In describing the typical operation, the sequence of operation may be readily realized by referring to FIG. 2B.

Immediately following the actuation of button 2B, the apparatus corresponding to remote station 12 is thus caused to be operated while a portion of the apparatus corresponding to remote station 13 and the button 3B is operated, with the remainder thereof being operated following the completion of operation of the apparatus corresponding to remote station 12. More particularly, storage relay 2ST is energized following the actuation of button 2B by a circuit extending from (+), through closed button 2B, through the winding of relay 2ST, through contact 56 of cancel button CNB, to (—). The capacitor 54 is charged through resistor 53 in accordance with the completion of such circuit which is effective after the release of button 2B to maintain the energizing circuit for relay 2ST until such relay is completely energized. A stick circuit for relay 2ST is completed following the energization thereof which extends from (+), through back contact 58 of relay 2LC, through front contact 59 of relay 2ST, through the winding of relay 2ST, through closed contact 56 of cancel button CNB, to (—). Following the energization of relay 2ST, in addition, the energizing circuits for station call lamp 2SCE and location code relay 2LC are completed for providing the respective energizations thereof. The energizing circuit for station call lamp 2SCE extends from (+), through front contact 60 of relay 2ST, through the lamp 2SCE, to (—). The circuit for relay 2LC extends from (+), through back contact 62 of relay LO, through back contact 63 of relay SC, through back contact 64 of relay 1ST, through front contact 65 of relay 2ST, through the winding of relay 2LC, through closed contact 66 of cancel button CNB, to (—). The relay LO common to all location code LC relays is thus caused to be energized following the energization of relay 2LC. The energizing circuit for lockout relay LO thus extends from (+), through front contact 68 of relay 2LC, over bus 69, through the winding of relay LO, to (—).

Following the energization of lockout relay LO, the timing circuit including relays LOP, GC and SC is effectively operated for causing a tone frequency to be transmitted which is detectable by all remote stations, while thereafter a tone frequency is caused to be transmitted which is detectable by only remote station 12. The transmitter modulator and power unit 17 is effective during such transmission in accordance with a connection to the energy source therefor through front contact 71 of relay LO. In addition, the energizing circuit for the transmitting lamp 2TE is established from (+), through front contact 70 of relay LO, over bus 73, through front contact 74 of relay 2LC, through the lamp 2TE, to (—). Thus, the operator at station 10 is apprised of the initial transmission of such tone frequencies to such remote stations.

The tone frequency detectable by all remote stations is transmitted for a predetermined duration of time which duration of time may be in the order of five seconds. This duration of time is appropriately controlled by the energization of relays LOP and GC. Following the energization of relay LO, the relay LOP is energized by a circuit which extends from (+), through front contact 76 of relay LO, through the winding of relay LOP, to (—). A resistor capacitor arrangement including resistor 78 and capacitor 79 connected in shunt with relay LOP is provided to make such relay LOP have slow release characteristics, the purpose for which will be apparent as the description progresses. Following the energization of relay LOP, the energizing circuit for relay GC is established and extends from (+), through front contact 81 of relay LOP, through the winding of relay GC, to (—). It will be noted that relay GC is indicated to be a slow pick up relay which in connection with the pick up of relay LOP comprises a lapse of time of approximately five seconds from the energization of relay LO. During such lapse of time, the tone generator 25 is connected to an appropriate energy source through front contact 83 of relay LO and a back contact 84 of relay GC. It is thus seen that the tone generator 25 is made operative for approximately five seconds which permits a tone frequency thereof to be transmitted to all remote stations. As indicated by the dotted line 38, a resultant tone frequency could be derived by the operation of tone generators 20, 21, 23 and 24 in the same manner.

Following the energization of relay GC, the combination of tone generators for remote station 12 are operated for a longer duration of time in accordance with the subsequent energization of relay SC. The energizing circuit for relay SC extends from (+), through front contact 86 of relay LO, through front contact 87 of relay GC, through the winding of relay SC, to (—). It will be noted that relay SC is indicated to be a slow pick up relay. For the purposes herein, it is desired that the relay SC take a longer duration of time to be fully energized than the time required for the energization of relays LOP and GC. For illustrative purposes, it will be assumed that relay SC takes approximately ten seconds in which to become fully energized once its energizing circuit is established. During such ten second duration of time, an appropriate energy source is connected to the tone generators 20, 22, 23 and 24 through contacts of relay 2LC. One circuit for tone generator 22, for example, extends from the energy source, through front contact 83 of relay LO, through front contact 84 of relay GC, through back contact 89 of relay SC, over bus 90, through front contact 49 of relay 2LC, to tone generator 22. When relay SC becomes energized, such energizing circuits through back contact 89 thereof are disconnected to thus make such tone generators inoperative. It will be noted that the transmitter modulator and power unit 17 is additionally connected to the appropriate energy source through front contact 92 of relay LOP.

When relay SC becomes energized, the relays and the transmitting lamp previously energized are caused to be deenergized. Initially, a stick circuit for relay 2LC extending from (+), through back contact 93 of relay SC, over bus 94, through front contact 95 of relay 2LC through the winding of relay 2LC, through closed contact 66 of cancel button CNB, to (—) is disconnected. Following the deenergization of relay 2LC, the energizing circuits for relay LO and lamp 2TE are disconnected to thus deenergize such relay and lamp. Following the deenergization of relay LO, the station call relay SC is deenergized since its energizing circuit is disconnected through front contact 86 of relay LO. The relay LOP is made slow release by the addition of resistor 78 and capacitor 79 in shunt therewith as stated above. The relay LOP thus remains energized for a sufficient time to await the reenergization of relay LO in accordance with other stored calls as defined by energized storage relays. In addition, the relay GC remains energized.

It will be recalled that button 3B is assumed to be actuated in addition to button 2B. The actuation of button 3B subsequent to the actuation of button 2B causes relay 3ST to be energized and the station call lamp 3SCE to thereafter be additionally energized. It will be noted that button 3B may be actuated at any time after the actuation of button 2B, but prior to the deenergization of transmitting lamp 2TE. As shown in the sequence chart of FIG. 2B, it is assumed that button 3B is actuated shortly after the actuation of button 2B. With this button actuation arrangement, it is obvious that the operator at station 10 may actuate a number of buttons following the actuation of a first button for providing that tone frequencies be transmitted to respective remote stations.

Following the release of relay SC, relay 3LC is energized through the circuit described above for relay 2LC except that such circuit includes back contact 65 of relay 2ST instead of front contact 65, front contact 97 of relay 3ST and the winding of relay 3LC. With relay 3LC energized, another energizing circuit for relay LO is established from (+), through front contact 99 of relay 3LC, over bus 69, through the winding of relay LO, to (—). Since the relays LOP and GC are held energized during the release of relay LO, the relay SC is immediately energized through front contact 86 of relay LO as before. Thus, the tone generators 20, 21, 22 and 23 are operated for approximately ten seconds to cause a resultant tone frequency to be transmitted and detected at remote station 13. When the relay SC is energized, the stick circuit for relay 3LC including back contact 93 of relay SC and front contact 101 of relay 3LC is disconnected to thus cause the deenergization of relay 3LC. The relays LO, LOP, GC and SC are then deenergized in the sequence shown in the sequence chart of FIG. 2B. In addition, the lamp 3TE energized in the manner described above for lamp 2TE is effective to denote that voice transmission may be initiated between the operator at station 10 and the operator at station 12, after which voice communication can be initiated between the operators at stations 10 and 13.

Figures 3, 4A:
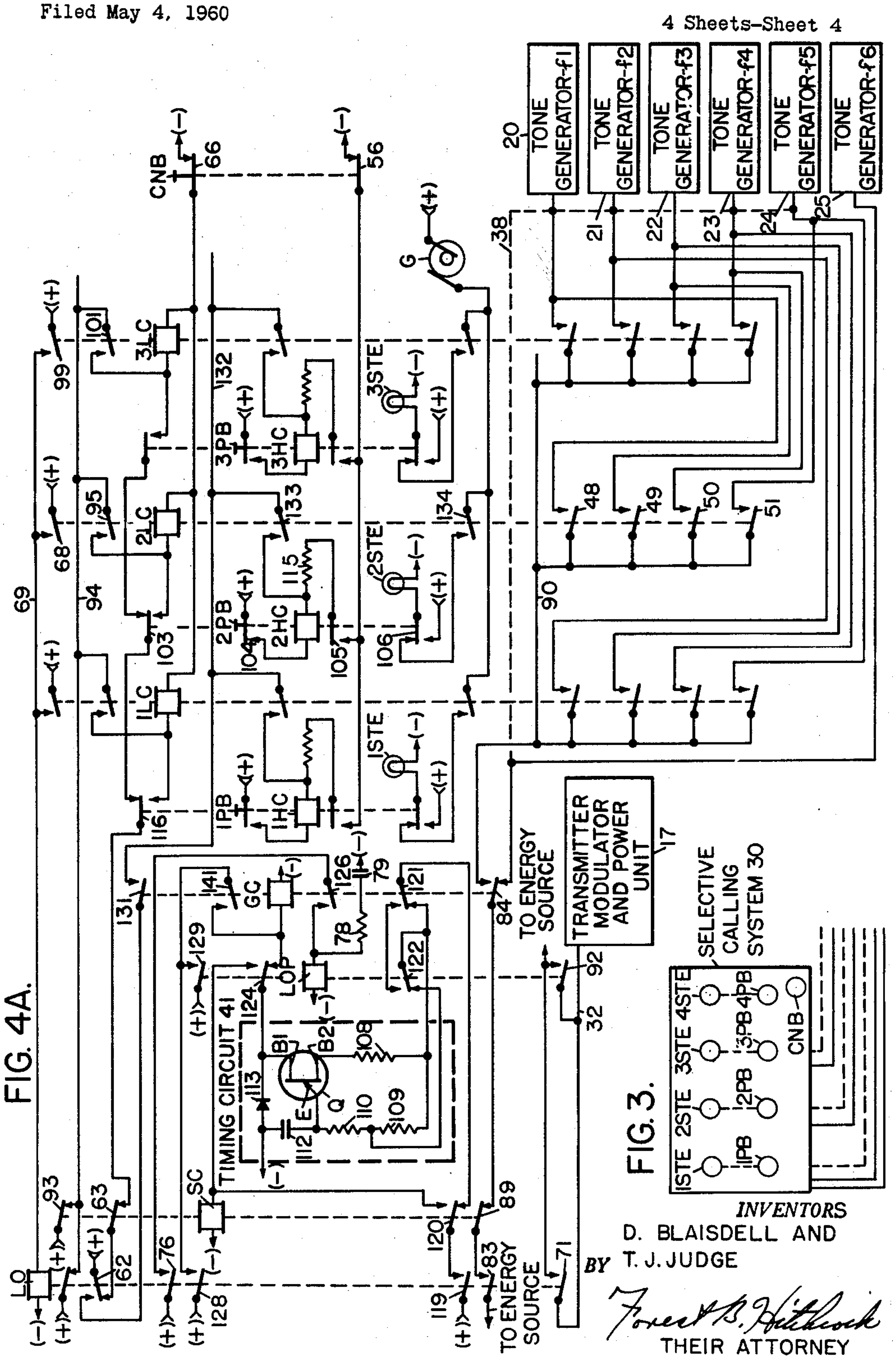
FIG. 3 is a partial block diagram of a modified system of this invention employable with the radio communication network of FIG. 1.
FIG. 4A is a circuit diagram illustrating another embodiment of the selective calling system of this invention.

It is contemplated that one lamp could be employed to provide indications of storage as well as time of transmission for each of the remote stations. A selective calling system of this type may be included with the radio communication network shown in block diagram in FIG. 1 and, more particularly, may appear similar to that shown in FIG. 3. As shown in FIG. 3, four push buttons 1PB, 2PB, 3PB and 4PB are provided with each of such buttons having a storage transmitting lamp associated therewith. For example, button 2PB has storage transmitting lamp 2STE in association therewith. The cancel button CNB is provided similar to that shown in FIG. 1. In lieu of providing two steadily illuminated indications, it is contemplated that a steady illumination be employed to denote a stored call, while a flashing illumination be employed to denote that transmission is being effected from station 10 which is detectable at the remote station corresponding to the flashing lamp.

*Structure of FIG. 4A*

In accordance with the change in lamps and lamp indications as described above, the detailed circuit of FIG. 4A is modified to the extent that the storage transmitting lamp corresponding to each station is adapted to be operated to two positions from the normally deenergized position, i.e., a steady illumination and a flashing illumination. Also, a separate timing circuit has been included in the detailed circuit of FIG. 4A to appropriately control the operation of relays LOP, GC and SC in accordance with the durations of time desired for operating respective tone generators.

To effect the operation of each storage transmitting lamp to both a steady illumination and a flashing illumination, additional apparatus has been included. In lieu of the buttons 1B, 2B and 3B, push buttons 1PB, 2PB and 3PB have been provided in the detailed circuit of FIG. 4A. Referring to FIG. 4A, it will be noted that each of such push buttons includes a plurality of contacts and a holding coil for holding the push button in an actuated condition following the actuation thereof. For example, push button 2PB includes holding coil 2HC which when energized holds such button 2PB and the contacts 103, 104, 105 and 106 therefor in an actuated condition, but the deenergization thereof causes such button and contacts to be released from such actuated condition. This organization is commonly called a microswitch Series 2 and is produced by the Microswitch Company located in Freeport, Illinois.

It will be noted that each of the storage transmitting lamps at times is connected in series with a direct current source for providing a steady illumination, while at other times each of such storage transmitting lamps is connected to a direct current energy source but in series with a generator G for providing a flashing illumination thereof. This will be considered in greater detail hereinafter. In addition, because of the inclusion of the type of microswitch herein, the energizing circuits for the location code LC relays have been somewhat modified as will be explained hereinafter.

It will be additionally noted that the relays LOP, GC and SC are all shown to be neutral single winding relays whereas in the detailed circuit of FIG. 2A, relays GC and SC are shown to be slow pick up relays. In order to provide the desired timing characteristics of the operation of such relays, a timing circuit 41 including a unijunction type transistor Q, resistors 108, 109 and 110 and capacitor 112 is provided.

The general manner of operation of the detailed circuit shown in FIG. 4A is similar to that shown in FIG. 2A except for a somewhat different operation of each storage transmitting means. In this connection, each storage transmitting lamp is effectively steadily illuminated for a longer period of time, while each storage transmitting lamp is effectively operated in a flashing manner for a decreased duration of time, but during substantially the time of transmission of a tone frequency which is detectable at a particular remote station.

*Operation of FIG. 4A*

In considering a typical operation of the detailed circuit of FIG. 4A, it is deemed appropriate to employ the assumptions made above in connection with FIG. 2A. In this connection, the push buttons 2PB and 3PB are assumed to be actuated in sequence for causing the respective tone generators to be operated similar to that described above. In considering the following description of a typical operation, reference may be made to FIG. 4B wherein the sequence of operation of respective elements is shown.

When push button 2PB is actuated, a circuit is completed for the associated holding coil 2HC which extends from (+), through closed contact 104 of push button 2PB, through the winding of holding coil 2HC, through resistor 115, through closed contact 105 of push button 2PB, through closed contact 56 of cancel button CNB, to (−). In addition to holding coil 2HC being energized, the storage transmitting lamp 2STE is steadily illuminated by an energizing circuit extending from (+), through closed contact 106 of push button 2PB, through lamp 2STE, to (−). Also, an energizing circuit for relay 2LC is established which extends from (+), through back contact 62 of relay LO, through back contact 63 of relay SC, through closed front contact 116 associated with push button 1PB, through closed back contact 103 associated with push button 2PB, through the winding of relay 2LC, through closed contact 66 of cancel button CNB, to (−). With relay 2LC thus being energized, the relay LO common to all LC relays is energized as described above and the relays LOP, GC and SC are subsequently energized in accordance with the control of the timing circuit 41.

Following the energization of relay LO, the timing circuit is initially effective to cause the energization of relay GC. Such energization is effected in accordance with the operation of unijunction transistor Q. Since it is desired to provide a substantially five second time lag between the energization of relay LO and GC, the resistor 110 and capacitor 112 included in timing circuit 41 are of such values as to provide that unijunction transistor Q remain deenergized for such time lag. More particularly, capacitor 112 is charged in accordance with the circuit being completed from (+), through front contact 119 of relay LO, through back contact 120 of relay SC, through back contact 121 of relay GC, through back contact 122 of relay LOP, through resistor 110, through capacitor 112, to (−). The unijunction transistor Q is seen to include an emitter E and two base sections B1 and B2. The potential on emitter E connected between resistor 110 and capacitor 112 is sufficient when capacitor 112 has been charged to a certain value to cause current flow between emitter E and base B1 for energizing relay GC. Base B2 is appropriately biased by a circuit extending from (+), through front contact 119 of relay LO, through back contact 120 of relay SC, through back contact 121 of relay GC, through resistor 108, to base B2, the energizing circuit for relay GC thus extends from (+) on emitter E, through base B1, through back contact 124 of relay LOP, through the winding of relay GC, to (−). The tone generator 25 is thus connected to an appropriate energy source through the circuit described above for approximately five seconds for causing the tone frequency thereof to be transmitted.

Following the energization of relay GC, a circuit is completed for energizing relay LOP which extends from (+), through front contact 76 of relay LO, through front contact 126 of relay GC, to thew inding of relay LOP, to (−). The resistor 78 and capacitor 79 are connected in shunt with relay LOP for purposes stated above. With relay LOP being thus energized, the timing circuit 41 is effectively connected to the relay SC for causing the energization thereof, but to provide a delay in such energization for approximately ten seconds.

In accordance with the energization of relays GC and LOP, the timing circuit 41 is caused to be operated after a longer duration of time for energizing relay SC. More particularly, the capacitor 112 is effectively charged in a longer duration of time because of increased series resistance for thus causing unijunction transistor Q to be energized in substantially ten seconds. The new charging circuit for capacitor 112 extends from (+), through front contact 119 of relay LO, through back contact 120 of relay SC, through front contact 121 of relay GC, through front contact 122 of relay LOP, through resistors 109 and 110, through capacitor 112, to (−). In addition, base B2 is biased with (+) by a circuit including resistor 108. Thus, the energizing circuit for relay SC extends from (+) on emitter E, to base B1, through front contact 124 of relay LOP, through the winding of relay SC, to (−). In accordance then with the energization of relay SC, the tone generators 20, 22, 23 and 24 are operated in the manner described above for substantially ten seconds for providing that a resultant tone frequency be transmitted and detected at remote station 12.

Appropriate stick circuits for the relays GC and SC to provide the desired energization thereof are included. A stick circuit for relay SC includes front contact 119 of relay LO, while stick circuits for relay GC includes respectively front contact 128 of relay LO and front contact 129 of relay LOP. Thus, relays GC and SC are appropriately maintained energized after capacitor 112 has been discharged during respective energizations through transistor Q and such relays GC and SC.

Following the energization of relay GC as described above, the holding coil 2HC associated with push button 2PB is appropriately shunted to cause the release or deenergization thereof. This shunt circuit extends from (+), through front contact 62 of relay LO, through front contact 131 of relay GC, over bus 132, through front contact 133 of relay 2LC, through resistor 115, through closed back contact 105 associated with push putton 2PB, through closed contact 56 of cancel button CNB, to (−). With push button 2PB thus being returned to a nonactuated position, an energizing circuit generator G for lamp 2STE is completed to cause such lamp to be operated in a flashing manner. Such circuit extends from (+), through generator G, through front contact 134 of relay 2LC, through closed front contact 106 associated with push button 2PB, through lamp 2STE, to (−).

When relay SC is energized, the stick circuit for relay 2LC is disconnected as described above which causes the release of relays LO and SC and the deenergization of lamp 2STE in the sequence shown in the sequence chart of FIG. 4B. The sequence therefore is similar to that described above for FIG. 2B and will not be repeated here.

When the relays LO and SC are deenergized, the energizing circuit for relay 3LC is completed in accordance with the actuation of push button 3PB. The respective circuits are again operated in a manner similar to that described above except that relay GC has been maintained energized because of the slow release circuit for relay LOP. Thus, the stick circuit for relay GC extending from (+), through front contact 129 of relay LOP, through front contact 141 of relay GC, through the winding of relay GC, to (−) maintains relay GC energized to thus cause only a substantially ten second tone frequency to be transmitted to remote station 13 in accordance with the operation of respective tone generators.

In providing for the control of relays GC and SC through the operation of the timing circuit 41, diode 113 is appropriately connected in shunt with relays GC and SC depending on the position of contact 124 of relay LOP. The inclusion of such diode 113 is effective to protect unijunction transistor Q from inductive voltage transients which may appear through the operation of relays GC and SC.

SUMMARY

From the above description and consideration of the several forms of the present invention, it will be apparent that the present invention contemplates the provision of a selective calling system in which the actuation of one button causes a tone frequency detectable at all remote stations to be transmitted for notifying operators thereat to stop using the common radio channel, while thereafter causing a tone frequency to be transmitted and detected only at the corresponding remote station for notifying the operator thereat that the operator at the central station desires to communicate therewith. It will also be apparent that the actuation of several of such buttons is effective to cause the common tone frequency to be transmitted only initially, while respective tone frequencies are caused to be transmitted and detected at the remote stations corresponding to the actuated buttons in a particular sequence.

In both forms of this invention, lamp indicating means are provided for indicating to the operator at the central station those remote stations which he desires to communicate with, while also providing an indication as to the current transmission of a tone frequency to all remote stations but detectable at only a particular remote station corresponding thereto.

Having described two different forms of a selective calling system as two specific embodiments of the present invention, it is desired to be understood that these forms have been selected to facilitate in the disclosure of the invention rather than to limit the number of forms which it may assume; and, it is to be further understood that various modifications, adaptations and alterations may be applied to the specific forms shown to meet the requirements of practice, without in any manner departing from the spirit or scope of the present invention.

What we claim is:

1. A system of calling a plurality of remote stations over a single communication channel where each remote station includes a receiver unit tuned to two distinct tone frequencies one of which is common to all remote stations from a central station including a transmitter unit comprising, in combination, at said central station (*a*) a plurality of tone generator means each normally inoperative but operable when set into operation to couple a predetermined tone frequency to said transmitter unit, (*b*) a plurality of selecting means one for each of said plurality of remote stations and having a normal non-actuated condition of operation and an actuated condition of operation, (*c*) a plurality of storage means one for each of said plurality of selecting means and each operable from its normal non-storage condition to a storage condition in response to its corresponding selecting means being at least temporarily operated to its actuated condition of operation, (*d*) a plurality of coding means one for each of said plurality of selecting means and its corresponding storage means and each operable to select concurrently for operation a particular number of said plurality of tone generator means less than the plurality, (*e*) means responsive to each of said plurality of coding means only in its operative condition for setting into operation the particular number of said tone generator means selected concurrently by the operating coding means, (*f*) circuit means for coupling control energy to each coding means for rendering it operable upon operation of its corresponding storage means to its storage condition and according to particular ones of said plurality of storage means each being in its non-storage condition while said means is non-responsive and then restoring its storage means to its non-storage condition, (*g*) timing means set into operation responsive to said means upon initial operation thereof for successively measuring first and second time intervals and thereafter measuring successively a plurality of second time intervals one for each additional coding means rendered operable, (*h*) control circuit means responsive to said timing means during measurement of said first time interval and said means in its responsive condition for setting a given one of said plurality of tone generator means into operation and thereafter responsive to said timing means during measurement of each second time interval and to said means in its responsive condition for setting into operation the particular number of tone generator means corresponding to the coding means then operating, said control circuit means being effective upon measurement of each second time interval to interrupt the coupling of control energy to said plurality of coding means, whereby the last operated coding means is rendered inoperative causing said means to be rendered non-responsive, (*i*) said transmitter unit including means for transmitting the common tone frequency to all remote stations and combining concurrently applied tone frequencies into the second of said two distinct tone frequencies for transmission over said single communication channel to the corresponding remote station.

2. The system according to claim 1 in which each of said plurality of storage means includes a lamp indicating means having a deenergized condition for indicating the non-storage condition of the corresponding storage means and an energized condition for indicating the storage condition of that corresponding storage means and further includes a circuit means responsive to the condition of the storage means for controlling the coupling of energy to said lamp indicating means, whereby all storage conditions of said plurality of storage means are indicated until respective said storage means are operated to non-storage conditions.

3. The system according to claim 1 in which each of said plurality of coding means includes a lamp indicating means having a deenergized condition for indicating the non-selection of tone generator means by the corresponding coding means and an energized condition for indicating the time interval of selection of the particular number of tone generator means corresponding to the operating coding means and further includes a circuit means responsive to the condition of the coding means and to said means in its responsive condition for controlling the coupling of energy to said lamp indicating means, whereby successive selections of particular numbers of tone generator means by successively operated coding means are indicated.

4. The system according to claim 1 wherein said timing means includes at least a first relay means responsive to said means upon initial operation thereof for measuring said first time interval and a second relay means responsive to said first relay means upon measurement of said first time interval and said means during the initial operation for measuring said second time interval, holding means responsive to said means during each responsive condition thereof for maintaining said first relay means responsive while said second relay means is intermittently rendered responsive according to the intermittent responsive conditioning of said means, said control circuit means including a circuit having a contact of said first relay means operated upon measurement of said first time interval for interrupting the operation of such given tone generator means and further including a circuit having said operated contact and a contact of said second relay means for interrupting the operation of the particular tone generator means selected according to the operating coding means.

5. The system according to claim 4 wherein said first time interval is in the order of five seconds and each of said second time intervals is in the order of ten seconds.

6. The system according to claim 4 in which said timing means further includes a timing circuit having a unijunction transistor initially set into operation in response to said means upon being rendered initially responsive for measuring said first time interval upon termination of which said first relay means is operated and further set into operation responsive to the operation of said first relay means for measuring said second time interval upon termination of which said second relay means is operated.

7. The system according to claim 1 and including a storage cancelling means having a normal non-actuated condition for coupling control energy to each of said plurality of storage means and said plurality of coding means and an actuated condition for decoupling such control energy, whereby any of said plurality of storage means and said plurality of coding means operated to storage conditions are simutlaneously cancellable.

8. The system according to claim 1 and further including a plurality of indicating devices, one for each of said plurality of selecting means, each said indicating device having a first indication for indicating non-storage, a second indication for indicating a storage condition of the corresponding storage means and a third indication for indicating the time interval of selection of the particular number of tone generator means corresponding to the operating coding means, and circuit means for each selecting means for coupling the corresponding indicating device to one source of energy in response to its storage means in its storage condition to provide said second indication and for coupling that indicating means to another source of energy in response to its coding means in its operated condition and the storage means in its non-storage condition for providing said third indication.

References Cited in the file of this patent

UNITED STATES PATENTS

| | | |
|---|---|---|
| 1,744,053 | Miller | Jan. 21, 1930 |
| 2,032,518 | Wheelock | Mar. 3, 1936 |
| 2,332,912 | Hecht et al. | Oct. 26, 1943 |
| 2,395,693 | Sorensen | Feb. 26, 1946 |
| 2,441,557 | Browne | May 18, 1948 |
| 2,503,371 | Bachelet | Apr. 11, 1950 |
| 2,547,024 | Noble | Apr. 3, 1951 |
| 2,602,853 | Harrison | July 8, 1952 |
| 2,626,384 | Winkler | Jan. 20, 1953 |
| 2,966,659 | Dahlbom et al. | Dec. 27, 1960 |
| 3,039,081 | Smith | June 12, 1962 |
| 3,098,220 | De Graaf | July 16, 1963 |